(12) United States Patent
Lee

(10) Patent No.: US 7,426,402 B2
(45) Date of Patent: Sep. 16, 2008

(54) SYSTEM AND METHOD FOR CONNECTING PERIPHERAL DEVICES WITH MOBILE COMMUNICATION TERMINAL

(75) Inventor: Chang Hee Lee, Anyang-Si (KR)

(73) Assignee: Curitel Communications, Inc., Seoul (KR)

( * ) Notice: Subject to any disclaimer, the term of this patent is extended or adjusted under 35 U.S.C. 154(b) by 562 days.

(21) Appl. No.: 11/020,613

(22) Filed: Dec. 23, 2004

(65) Prior Publication Data

US 2005/0148365 A1    Jul. 7, 2005

(30) Foreign Application Priority Data

Dec. 26, 2003    (KR) .................... 10-2003-0097361

(51) Int. Cl.
*H04B 1/38*    (2006.01)

(52) U.S. Cl. .................... 455/557; 455/550.1

(58) Field of Classification Search ............ None
See application file for complete search history.

(56) References Cited

U.S. PATENT DOCUMENTS 4,972,470 A    11/1990    Farago .................... 380/3
6,611,888 B2 *  8/2003    Tiede .................... 710/63

FOREIGN PATENT DOCUMENTS

KR    9745252    12/1995

* cited by examiner

*Primary Examiner*—Thanh C Le
(74) *Attorney, Agent, or Firm*—Ohlandt, Greeley, Ruggiero & Perle L.L.P.

(57) ABSTRACT

Disclosed is a system for connecting peripheral devices with a mobile communication terminal that can implement connections between various mobile communication terminals and peripheral devices. The system according to the present invention has a connecting part for connecting the peripheral device to a mobile communication terminal or computer; a storing part for storing a connection profile so as to connect the peripheral device to the mobile communication terminal; and a controlling part for defining connection between the peripheral device and the mobile communication terminal by setting up pin assignments based on the connection profile stored in the storing part.

2 Claims, 5 Drawing Sheets

SYSTEM AND METHOD FOR CONNECTING PERIPHERAL DEVICES WITH MOBILE COMMUNICATION TERMINAL

CROSS-REFERENCE TO RELATED APPLICATION

The present application is claiming priority of Korean Patent Application No. 10-2003-0097361, filed on Dec. 26, 2003, the content of which is incorporated herein by reference.

BACKGROUND OF THE INVENTION

1. Field of the Invention

The present invention relates to a system and method for connecting peripheral devices with mobile communication terminal. More particularly, the present invention relates to a system and method for setting up software-defined interface between peripheral devices and a variety of mobile communication terminals having different connector architecture.

2. Description of the Related Art

As a range of applications of mobile communication terminals has been gradually extended, necessity that various peripheral devices such as an external memory, a Moving Picture Experts Group layer 3 (MP3) player and a wireless connection device complying with diverse standards, etc. are to be connected to the mobile communication terminal is more increasing.

However, since it is impossible to change pin assignments of connector of the peripheral devices in the prior art once the pin assignments is defined for one mobile communication terminal, peripheral devices having different pin assignments from that of connector of the mobile communication terminal could not be connected to the other mobile communication terminal.

In other words, the peripheral device having fixed pin assignments allows a connection only with a predetermined specific mobile communication terminal, there have been wastes of resources.

SUMMARY OF THE INVENTION

Accordingly, the present invention has been made to solve the above-mentioned problems occurring in the prior art. The object of the present invention is to provide a system and a method for connecting peripheral devices that can implement connections between various mobile communication terminals and peripheral devices.

In order to accomplish the objects, there is provided a system for connecting peripheral devices comprising: a connecting part for connecting the peripheral device to a mobile communication terminal or computer; a storing part for storing a connection profile so as to connect the peripheral device to the mobile communication terminal; and a controlling part for defining connection between the peripheral device and the mobile communication terminal by setting up pin assignments based on the connection profile stored in the storing part.

Preferably, the system further comprises: a displaying part for displaying a status of connection between the peripheral device and the mobile communication terminal; and an inputting part for receiving a connection mode from a user.

Preferably, the connection modes may be classified into a connection setting mode and a function mode when the mobile communication terminal is connected through the connecting part to the peripheral device.

Preferably, the controlling part may judge whether the peripheral device is connected to a mobile communication terminal or a computer by judging whether power received through the connecting part is a battery power of a mobile communication terminal or a power received from a computer through a connecting means, and judge whether the connection mode is a connection setting mode or a function mode.

In order to achieve the above objects, there is provided a method of connecting peripheral devices comprising: sensing a connection of a mobile communication terminal or a computer and receiving power from the connected mobile communication terminal or computer; judging whether the received power is a battery power of the mobile communication terminal or a power of the computer; downloading a connection profile from the computer and storing the connection profile, when the received power is the power of the computer; and displaying a directory where the connection profile is stored.

Preferably, the method further comprises: when the received power is the battery power of the mobile communication terminal, judging whether a connection mode instructed from a user is a connection setting mode or a function mode; when the connection mode is the connection setting mode, defining a connection between the mobile communication terminal and the peripheral device according to the corresponding connection setting mode; and displaying a connection-activated status.

Preferably, the method further comprises: when the connection mode is a function mode, performing a connection between the mobile communication terminal and the peripheral device using a previously used connection profile.

Preferably, the act of defining the connection between the mobile communication terminal and the peripheral device comprises: displaying a setting mode selection message; receiving a setting mode selection from the user and judging whether the selected setting mode is a manual setting mode or a pre-defined setting mode; receiving a pin assignments from the user when the selected setting mode is the manual setting mode; and setting up the connection between the mobile communication terminal and the peripheral device according to the user's pin assignments.

Preferably, the act of defining the connection between the mobile communication terminal and the peripheral device further comprises: reading the stored connection profile when the selected setting mode is the pre-defined setting mode; and setting up the connection between the mobile communication terminal and the peripheral device according to the connection profile.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

First, a system for connecting peripheral devices according to a preferred embodiment of the present invention will be described with reference to FIGS. 1A and 1B.

Figure 1A:
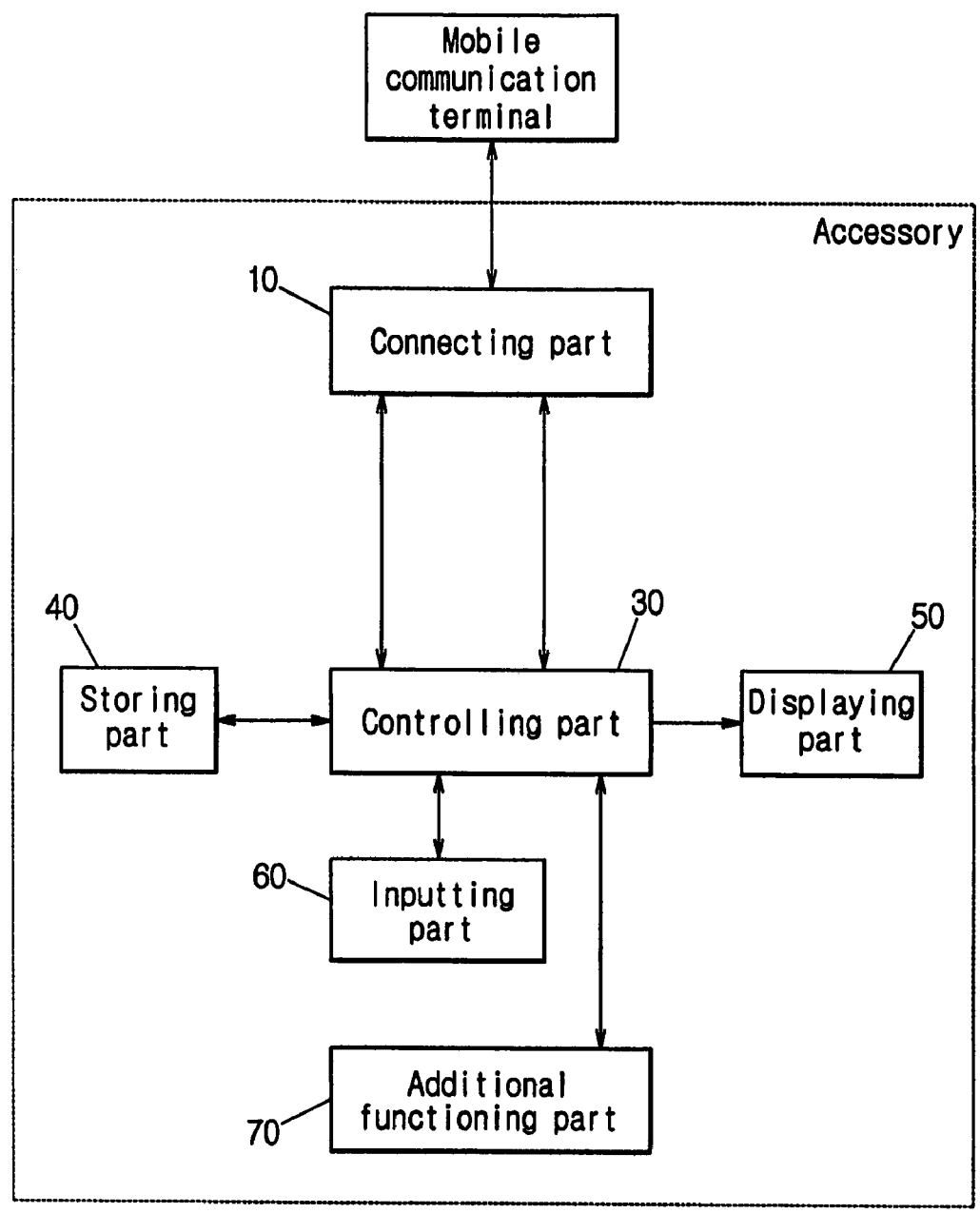
FIG. 1A illustrates a case that a mobile communication terminal is connected to a system for connecting peripheral devices according to a preferred embodiment of the present invention.
Figure 1B:
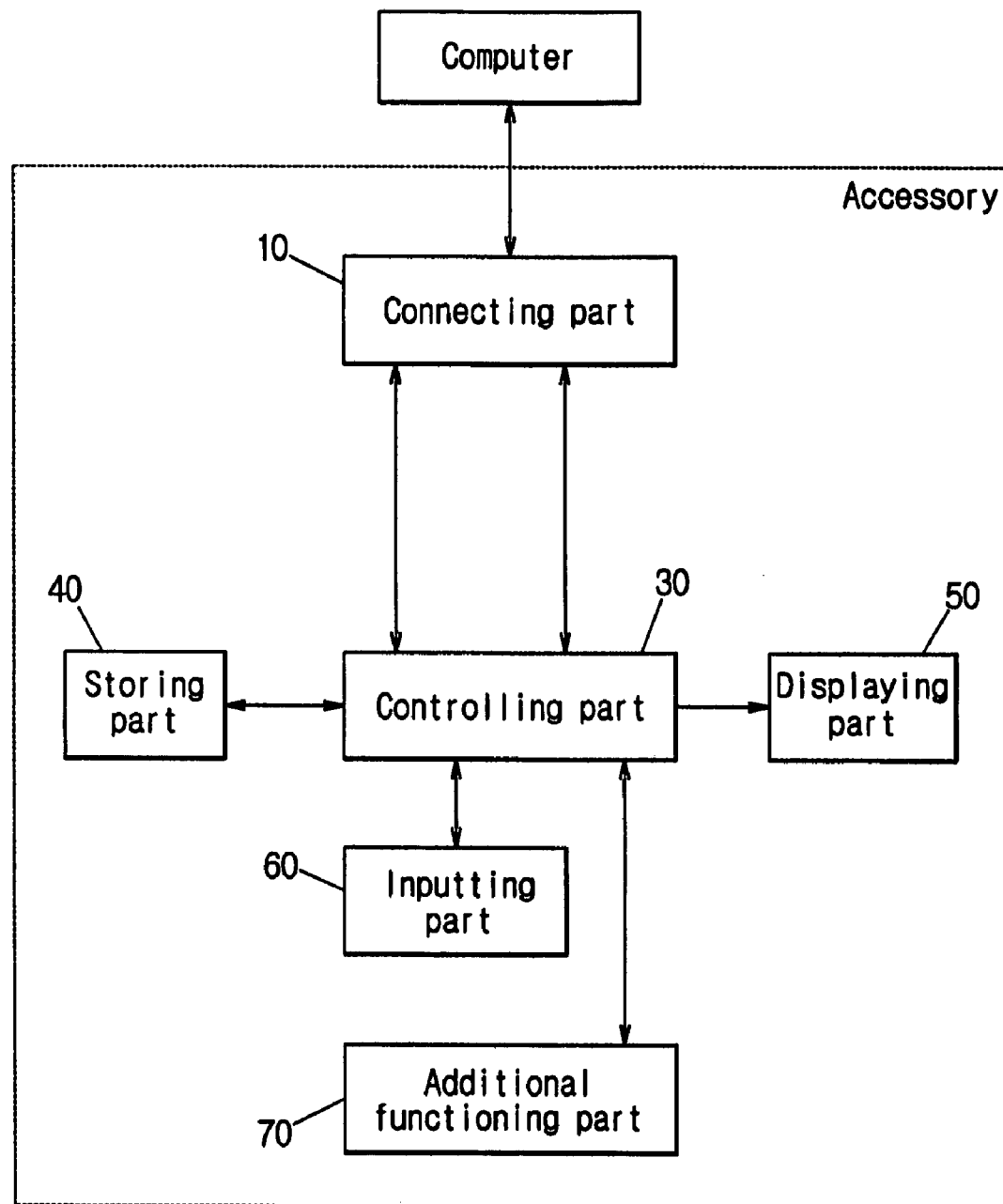
FIG. 1B illustrates a case that a computer is connected to a system for connecting peripheral devices according to a preferred embodiment of the present invention.

FIG. 1A illustrates that a mobile communication terminal is connected to a system for connecting peripheral devices according to a preferred embodiment of the present invention, and FIG. 1B illustrates that a computer is connected to a system for connecting peripheral devices according to a preferred embodiment of the present invention.

The system for connecting peripheral devices according to the preferred embodiment of the present invention comprises a connecting part 10, a controlling part 30, a storing part 40, a displaying part 50 and an inputting part 60. The system for connecting peripheral devices according to the preferred embodiment of the present invention is provided in the peripheral device. A mobile communication terminal or a computer is connected through the connecting part 10. FIG. 1A illustrates that a mobile communication terminal is connected through the connecting part 10, and FIG. 1B illustrates that a computer is connected through the connecting part 10.

An additional functioning part 70 serves to perform an inherent function of the peripheral device and perform functions of data input/output, power input and ground.

The controlling part 30 senses a connection of the mobile communication terminal or computer through the connecting part 10, sets up pin assignments, reads a connection profile stored in the storing part 40, controls the displaying part 50 to display status of connection between the peripheral device and the mobile communication terminal, controls the additional functioning part 70 to be operated according to pin assignments, and senses a connection mode inputted through the inputting part 60.

The storing part 40 stores a connection profile downloaded through a computer according to control of the controlling part 30.

The displaying part 50 displays status of connection between the mobile communication terminal and the peripheral device according to control of the controlling part 30. And, when pin assignments is inputted manually by the user, the displaying part 50 supports manual input of the pin assignments by displaying pin number and function of the pin in a successive way.

The inputting part 60 receives a connection mode from the user. The connection mode comprises a connection setting mode and a function mode. Specifically, when the system for connecting peripheral device is connected to a mobile communication terminal, the connection mode is classified into a connection setting mode and a function mode. When the connection setting mode is inputted through the inputting part 60, the system for connecting peripheral devices sets up a connection with the mobile communication terminal through a connection defining process according to the present invention. To the contrary, when the function mode is inputted through the inputting part 60, the connection defining process is not required since a connection with the mobile communication terminal is set up using connection profile used in the previous connection. After the connection with the mobile communication terminal is completed, the system for connecting peripheral devices displays a connection-activated status.

The inputting part 60 also serves to perform its function by receiving pin assignments from the user when the pin assignments is defined by the user without using connection profile downloaded through computer.

The connection between the peripheral device and the mobile communication terminal is defined by the controlling part. When connection profile is downloaded, the connection is set up based on the connection profile stored in the storing part. On the other hand, when pin assignments defined by the user is inputted through the inputting part, the connection is set up based on the pin assignments.

Hereinafter, a method for connecting peripheral devices will be described with reference to FIG. 2.

Figure 2:
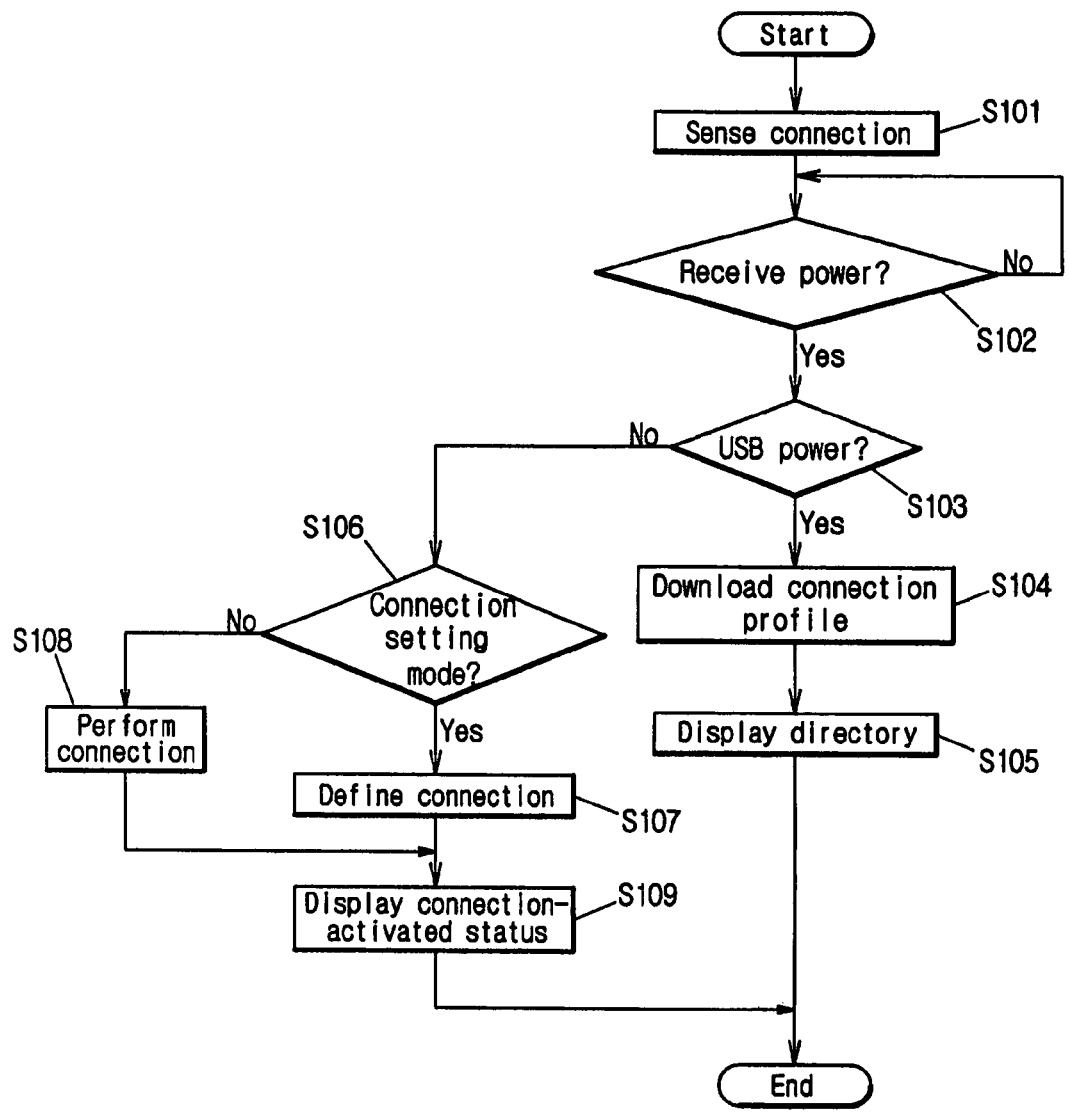
FIG. 2 is a flow chart illustrating a method for connecting peripheral devices according to a preferred embodiment of the present invention.

FIG. 2 is a flow chart illustrating a method for connecting peripheral devices according to a preferred embodiment of the present invention.

A mobile communication terminal or a computer is connected to the system for connecting peripheral devices through the connecting part 10. The controlling part 30 senses the connection (S101) and the system receives power (S102). When a mobile communication terminal is connected to the system, the system for connecting peripheral devices receives a battery power of the mobile communication terminal, and when a computer is connected to the system, the system receives a power of the computer through a connecting means such as an universal serial bus (USB) cable.

Then, the controlling part 30 judges whether the received power is the battery power of the mobile communication terminal or the power of the computer (S103).

If the received power turns out to be the power of the computer as a result of judgment in S3, the controlling part 30 downloads a connection profile from the computer and makes the storing part 40 store the connection profile therein (S104), and controls the displaying part to display directory where the connection profile is stored (S105). At this time, the connection profile can be obtained from a hard disk of the computer connected to the peripheral device, or downloaded from a homepage of manufacturing company of the mobile communication terminal or the peripheral device using an Internet, etc. An upgrade version of the previously downloaded connection profile may be downloaded, as with the above case.

Meanwhile, if the received power turns out to be the battery power of the mobile communication terminal as a result of judgment in S3, the controlling part 30 judges whether the connection mode received from the user through the inputting part 60 is the connection setting mode or the function mode (S106).

At this time, if the connection mode is the connection setting mode as a result of judgment in S106, the controlling part 30 defines a connection between the mobile communication terminal and the peripheral device according to the corresponding connection setting mode (S107).

To the contrary, if the connection mode is the function mode as a result of judgment in S106, the controlling part 30 performs a connection between the mobile communication terminal and the peripheral device based on previously used connection profile without a process of defining connection (S108).

For both the function mode and the connection setting mode, the displaying part 50 displays a connection-activated status after the connection is completed.

To be more specific, when a peripheral device designed for a mobile communication terminal manufactured by company A is used, if the system already has a connection profile required for connecting to the mobile communication terminal manufactured by the company A in a stored form and the peripheral device has been previously connected to the mobile communication terminal, the process of defining connection is not required. Accordingly, a connection between the mobile communication terminal and the peripheral device is immediately performed. However, when the peripheral device is connected to a mobile communication terminal manufactured by company B, another connection profile different from the existing connection profile is required. Thus, the system downloads the connection profile required for connection with the mobile communication terminal manufactured by B after connecting to a computer, and stores the connection profile in the storing part of the system. Then, the system sets up new connection to the mobile communication terminal manufactured by company B by reading the stored connection profile. Alternatively, the system may receive pin assignments directly from the user through the inputting part and sets up connection between the peripheral device and the mobile communication terminal manufactured by company B.

Hereinafter, a process of defining connection between the mobile communication terminal and the peripheral device will be described with reference to FIG. 3.

Figure 3:
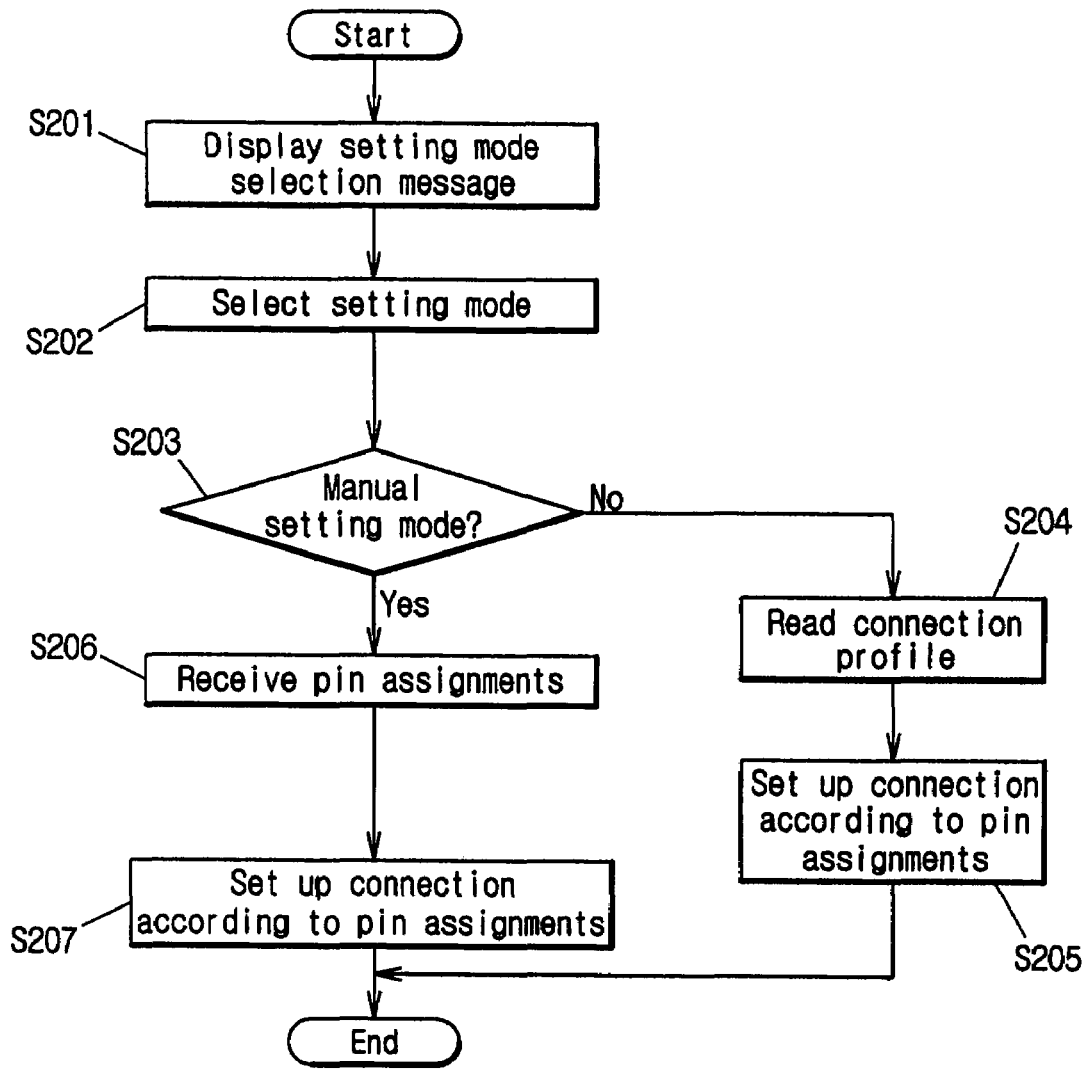
FIG. 3 is a flow chart illustrating a process of defining connection between a mobile communication terminal and a peripheral device illustrated in FIG. 2.

FIG. 3 is a flow chart illustrating a process of defining connection between the mobile communication terminal and the peripheral device.

The controlling part 30 displays a setting mode selection message through the displaying part 50 (S201). The setting mode comprises a manual setting mode using a connection defined by a user and a pre-defined setting mode using a previously defined connection profile.

The system receives setting mode selection from the user through the inputting part (S202).

Then, whether the selected setting mode is the manual setting mode or the pre-defined setting mode is judged (S203).

At this time, if the selected setting mode turns out to be the pre-defined setting mode as a result of judgment in S203, the controlling part 30 reads the connection profile stored in the storing part 40 (S204) and then sets up the connection between the mobile communication terminal and the peripheral device according to the corresponding connection profile (S205).

To the contrary, if the selected setting mode turns out to be the manual setting mode as a result of judgment in S203, the controlling part 30 receives a pin assignments from the user through the inputting part 60 (S206), and then sets up the connection between the mobile communication terminal and the peripheral device according to the pin assignments received from the user (S207).

Hereinafter, an example of pin assignments in a system and method for connecting peripheral devices according to the present invention will be described with reference to the FIG. 4.

Figure 4:
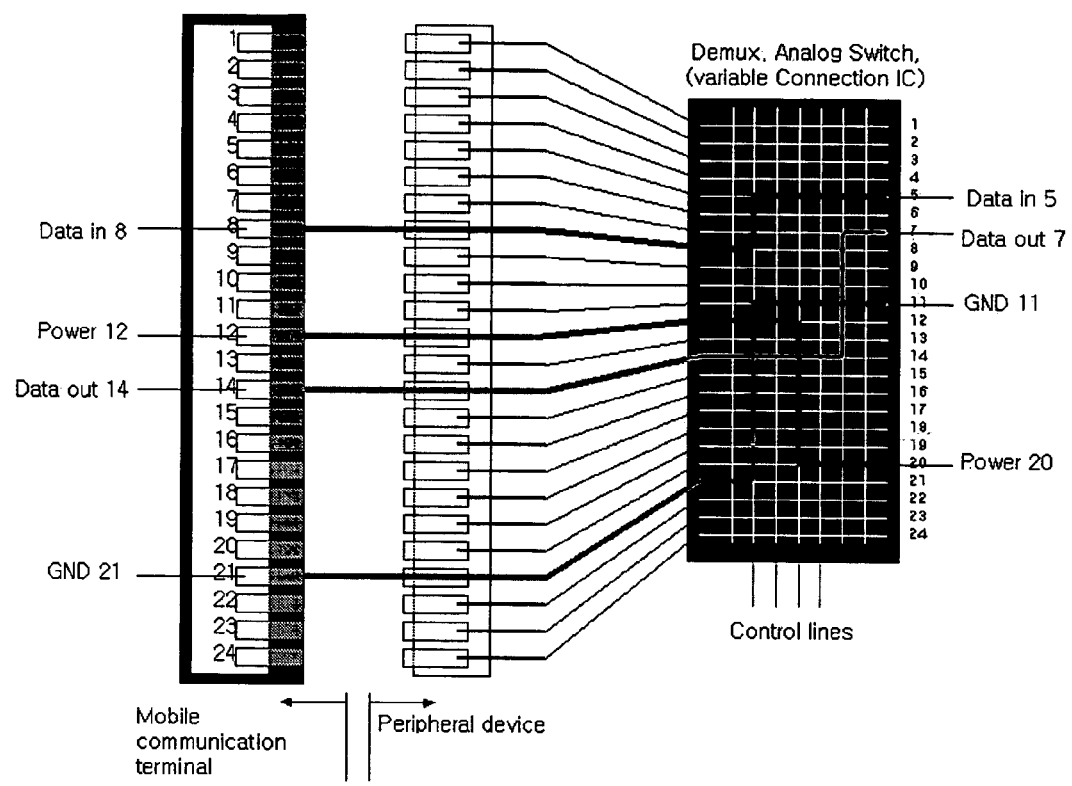
FIG. 4 illustrates an example of pin assignments.

FIG. 4 illustrates that a connector of a mobile communication terminal, of which power, data input, data output and ground pin number is 12, 8, 14 and 21, is connected to the peripheral device of which power, data input, data output and ground pin number is 20, 5, 7 and 11. FIG. 4 illustrates a mobile communication terminal and a peripheral device both equipped with a connector having 24 pins. Preferably, the number of pins in connectors of the mobile communication terminal and the peripheral device is the same.

The pin assignments can be obtained from a hard disk of the computer connected to the peripheral device, or downloaded from a homepage of manufacturing company of the mobile communication terminal or the peripheral device using an Internet, etc.

As described above, according to the present invention, a pin assignments of the system for connecting peripheral devices can be changed, so that connections between various mobile communication terminals and a peripheral device can be implemented with reducing dependence on kinds of mobile communication terminals.

Accordingly, it is possible to improve compatibility of the peripheral device, and to obtain a positive effect in utilizing resources.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A system for connecting peripheral devices comprising:
a connecting part for connecting the peripheral device to a mobile communication terminal or computer;
a storing part for storing a connection profile so as to connect the peripheral device to the mobile communication terminal;
a controlling part for defining connection between the peripheral device and the mobile communication terminal by setting up pin assignments based on the connection profile stored in the storing part;
a displaying part for displaying a status of connection between the peripheral device and mobile communication terminal; and
an inputting part for receiving a connection mode from a user,
wherein the controlling part judges whether the peripheral device is connected to a mobile communication terminal or a computer by judging whether power received through the connecting part is a battery power of a mobile communication terminal or a power received from a computer through a connecting means, and judges whether the connection mode is a connection setting mode or a function mode.

2. The system according to claim 1, wherein the connecting means is an universal serial bus (USB) cable.

* * * * *